(12) United States Patent
Moriai

(10) Patent No.: US 8,780,942 B2
(45) Date of Patent: Jul. 15, 2014

(54) COMMUNICATION DEVICE AND A DELAY AMOUNT DETECTION METHOD

(75) Inventor: Shinsuke Moriai, Gifu (JP)

(73) Assignee: KYOCERA Corporation, Kyoto (JP)

( * ) Notice: Subject to any disclaimer, the term of this patent is extended or adjusted under 35 U.S.C. 154(b) by 455 days.

(21) Appl. No.: 13/318,239

(22) PCT Filed: Jun. 9, 2010

(86) PCT No.: PCT/JP2010/059735
§ 371 (c)(1),
(2), (4) Date: Oct. 31, 2011

(87) PCT Pub. No.: WO2010/150652
PCT Pub. Date: Dec. 29, 2010

(65) Prior Publication Data
US 2012/0044832 A1 Feb. 23, 2012

(30) Foreign Application Priority Data
Jun. 26, 2009 (JP) ................................. 2009-153011

(51) Int. Cl.
*H04B 3/10* (2006.01)
*H04J 1/16* (2006.01)
*H04L 27/26* (2006.01)

(52) U.S. Cl.
CPC ................................ *H04L 27/2663* (2013.01)
USPC .......................... 370/491; 370/210; 370/500

(58) Field of Classification Search
CPC ............ H04L 27/2646; H04L 27/2662; H04L 27/2663; H04L 27/2672; H04L 27/2675; H04W 56/0005
See application file for complete search history.

(56) References Cited

U.S. PATENT DOCUMENTS

2009/0304126 A1* 12/2009 Sahara .......................... 375/343
2010/0080330 A1* 4/2010 Kawauchi et al. ............. 375/348

FOREIGN PATENT DOCUMENTS

| JP | 2009-010662 A | | 1/2009 | |
| WO | WO2008001424 | * | 1/2008 | .............. H04J 11/00 |

OTHER PUBLICATIONS

International Search Report and Written Opinion dated Sep. 14, 2010, issued for International Application No. PCT/JP2010/059735.
Arib Standard, OFDMA/TDMA TDD Broadband Wireless Access System (Next Generation PHS), Arib STD-T95 Version 1.1, Jun. 8, 2008, Association of Radio Industries and Businesses.

* cited by examiner

*Primary Examiner* — Jae Y Lee
(74) *Attorney, Agent, or Firm* — Procopio, Cory, Hargreaves & Savitch LLP

(57) ABSTRACT

A detection section (8) of a communication device (1) includes a correlation calculation section for calculating correlation between a known TCCH symbol pattern and a demodulated complex symbol pattern received by a reception section (20) in each of a last symbol period in one sub-slot and subsequent one symbol period and a reception state acquisition section for obtaining, based on a result of the calculation in the correlation calculation section, a delay amount of a timing of receiving the signal from a communication partner device.

6 Claims, 9 Drawing Sheets

F I G . 1
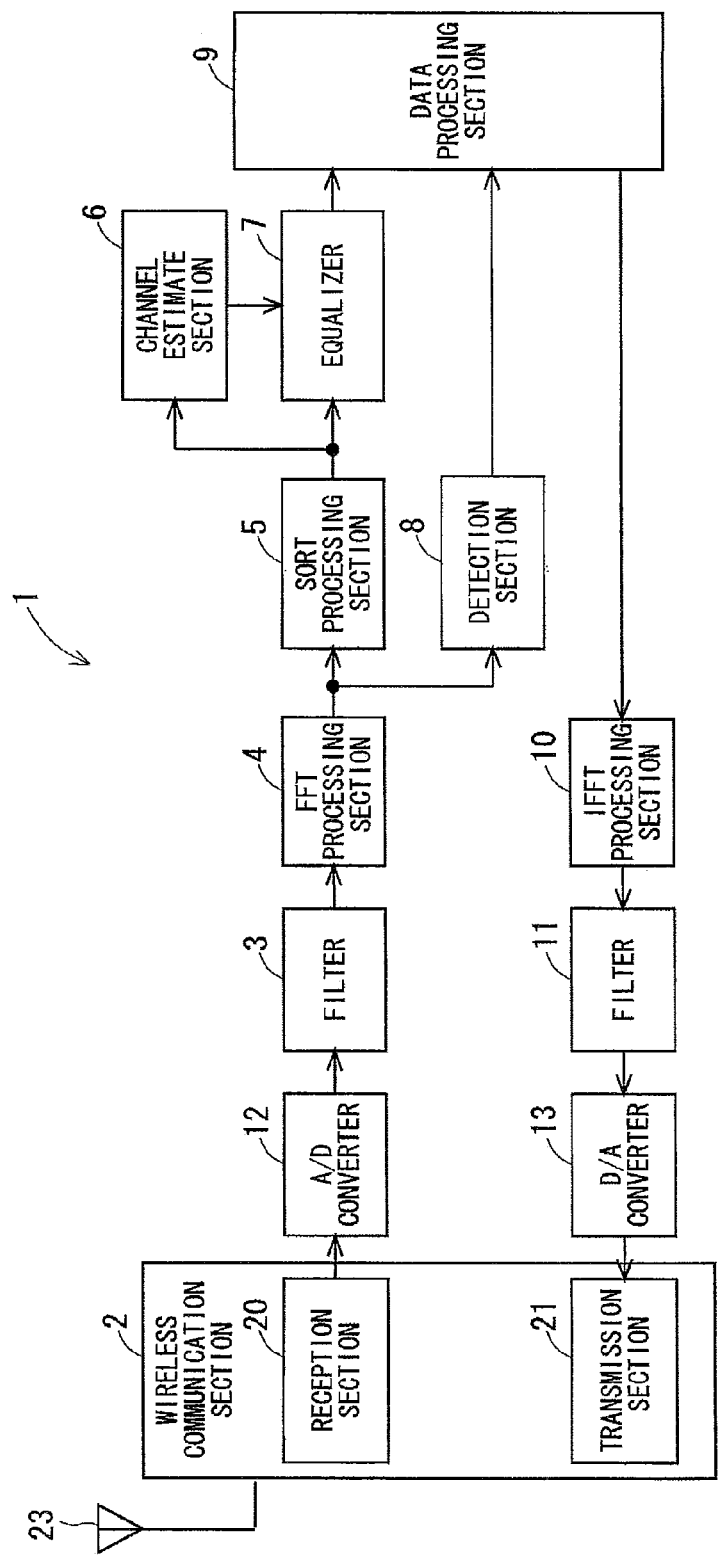

F I G . 3
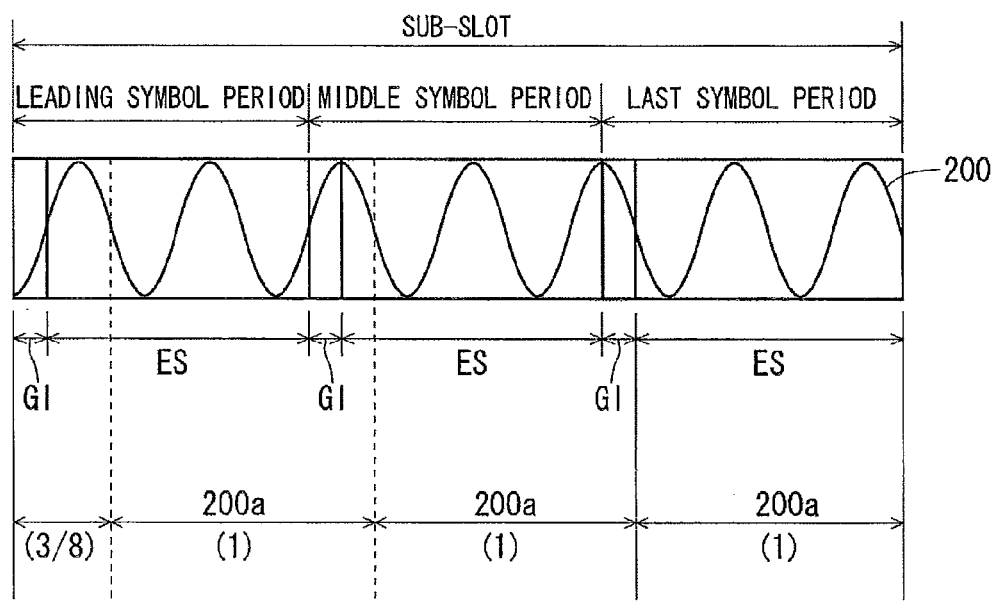

FIG. 5

| SUBCARRIER | DEMODULATED COMPLEX SYMBOL | TCCH COMPLEX SYMBOL | CORRELATION VALUE |
|---|---|---|---|
| F1 | a1+jb1 | c1+jd1 | (a1+jb1)·(c1−jd1) |
| F2 | a2+jb2 | c2+jd2 | (a2+jb2)·(c2−jd2) |
| ... | ... | ... | ... |
| F12 | a12+jb12 | c12+jd12 | (a12+jb12)·(c12−jd12) |
| F14 | a14+jb14 | c14+jd14 | (a14+jb14)·(c14−jd14) |
| F15 | a15+jb15 | c15+jd15 | (a15+jb15)·(c15−jd15) |
| ... | ... | ... | ... |
| F24 | a24+jb24 | c24+jd24 | (a24+jb24)·(c24−jd24) |

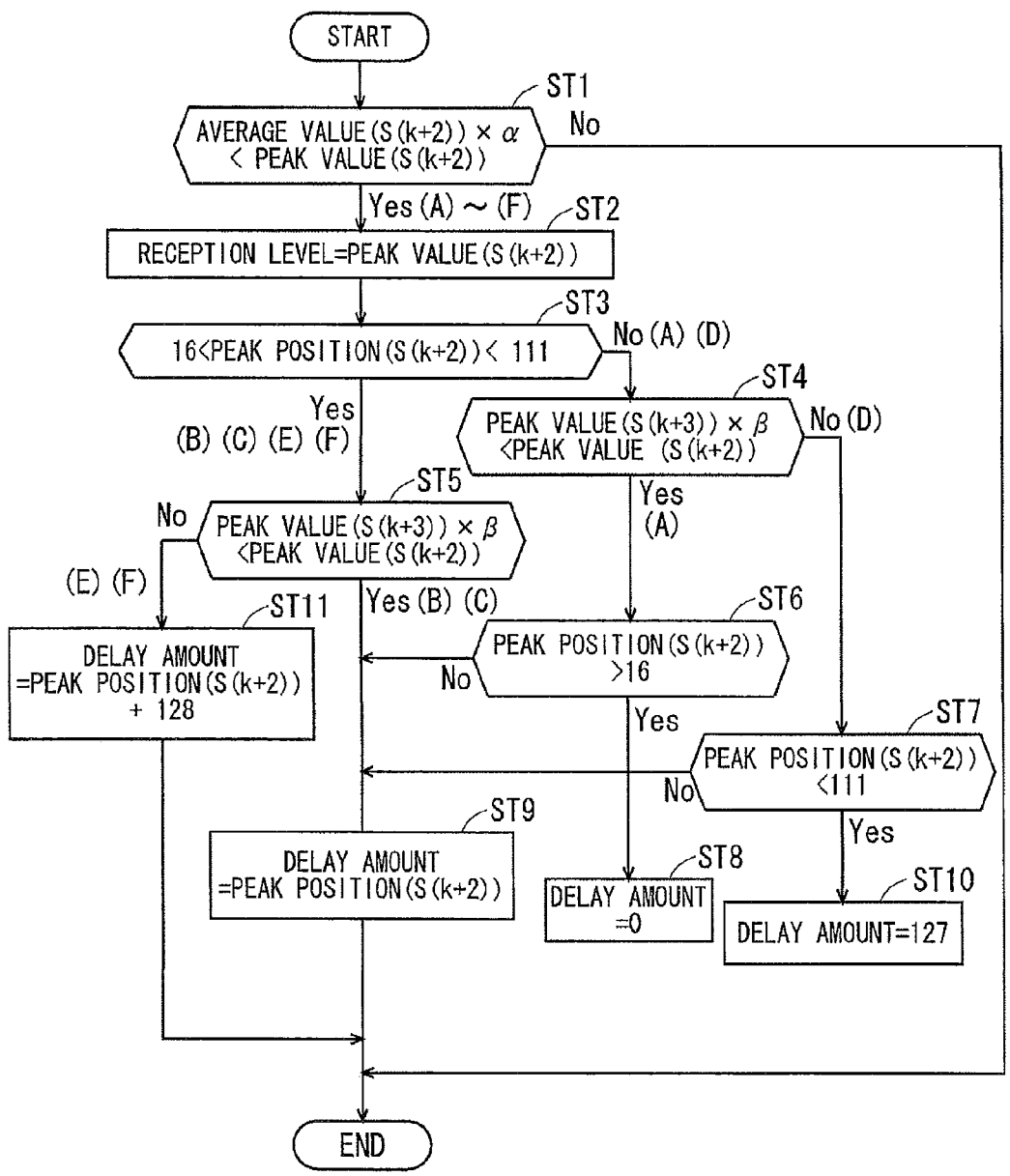
F I G. 7

COMMUNICATION DEVICE AND A DELAY AMOUNT DETECTION METHOD

TECHNICAL FIELD

The present invention relates to a communication device for detecting a delay amount of a timing of receiving a signal from a communication partner device, and to a method for detecting the delay amount.

BACKGROUND ART

Conventionally, various techniques of wireless communication have been proposed. For example, Patent Document 1 discloses a technique in which a base station controls a transmission timing of a communication terminal based on a known signal transmitted from the communication terminal. Non-Patent Document 1 shows a standard concerning a next-generation PHS (Personal Handyphone System).

PRIOR-ART DOCUMENTS

Patent Documents

Patent Document 1: Japanese Patent Application Laid-Open No. 2009-10662

Non-Patent Documents

Non-Patent Document 1: "OFDMA/TDMA TDD Broadband Wireless Access System (Next Generation PHS) ARIB STANDARD", ARIB STD-T95 Version1.1, Jun. 6, 2008, The Association of Radio Industries and Businesses

SUMMARY OF THE INVENTION

Problems to be Solved by the Invention

In the next-generation PHS, a base station is capable of simultaneous communication with a plurality of communication terminals by means of the OFDMA (Orthogonal Frequency Division Multiple Access) scheme using an OFDM (Orthogonal Frequency Division Multiplexing) signal. The base station performs communication with each communication terminal by using its own timing as a reference timing. Accordingly, the base station is not synchronized with the communication terminal, and if the communication terminal transmits a signal at its own timing, the signal supplied from the communication terminal may not be subjected to an FFT (Fast Fourier Transform) process in an appropriate timing in the base station. As a result, the base station cannot appropriately demodulate the signal from the communication terminal, and may not correctly obtain information contained in the signal. Particularly in the OFDMA scheme, a single OFDM signal is made up of signals supplied from a plurality of communication terminals, and therefore if transmission timings of the plurality of communication terminals are not coincident, the orthogonality of the signals supplied from the plurality of communication terminals is destroyed. This consequently makes it impossible for the base station to correctly obtain information contained in the signals supplied from the plurality of communication terminals.

To solve such a problem, the base station obtains a delay amount of a timing of receiving the signal from the communication terminal relative to the reference timing specified in the base station itself. Then, based on the delay amount thus obtained, the base station controls a transmission timing of the communication terminal. This enables the base station to receive all of the signals from the plurality of communication terminals at the reference timing. As a result, the base station can perform, at an appropriate timing, the FFT process on the signal supplied from each communication terminal, and also can ensure the orthogonality of the signals supplied from the plurality of communication terminals. Therefore, the base station can correctly obtain the information contained in the signal supplied from each communication terminal.

In this manner, a communication device sometimes detects a delay amount of a timing of receiving a signal supplied from a communication partner device.

The present invention has been accomplished in view of the above, and an object of the present invention is to provide a technique that allows a communication device to detect, with an improved accuracy, a delay amount of a timing of receiving a signal supplied from a communication partner device.

Means for Solving the Problems

A Communication device according to the present invention is a communication device communicating with a communication partner device, the communication device including: a reception section for receiving a known signal that is continuously and repeatedly transmitted from the communication partner device during a plurality of continuous partner's unit time periods specified based on a timing in the communication partner device; a correlation calculation section for calculating correlation between a signal received by the reception section and the known signal in each of at least two unit time periods in a plurality of own unit time periods specified based on a timing in the communication device and corresponding to the plurality of partner's unit time periods and subsequent one own unit time period that follows the plurality of own unit time periods, the at least two unit time periods including either one of a leading unit time period and a last unit time period and also including one of the plurality of own unit time periods other than the leading unit time period; and a delay amount acquisition section for obtaining, based on a result of the calculation in the correlation calculation section, a delay amount of a timing of receiving the signal from the communication partner device.

A delay amount detection method according to the present invention is a delay amount detection method for detecting, in a communication device, a delay amount of a timing of receiving a signal from a communication partner device, the delay amount detection method including: a reception step of receiving a known signal that is continuously and repeatedly transmitted from the communication partner device during a plurality of continuous partner's unit time periods specified based on a timing in the communication partner device; a calculation step of calculating correlation between a signal received by the reception section and the known signal in each of at least two unit time periods in a plurality of own unit time periods specified based on a timing in the communication device and corresponding to the plurality of partner's unit time periods and subsequent one own unit time period that follows the plurality of own unit time periods, the at least two unit time periods including either one of a leading unit time period and a last unit time period and also including one of the plurality of own unit time periods other than the leading unit time period; and an acquisition step of obtaining, based on a result of the calculation in the calculation step, a delay amount of a timing of receiving the signal from the communication partner device.

Effects of the Invention

A delay of one unit time period or longer can be detected in the timing of receiving the signal from the communication partner device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram showing a configuration of a communication device according to an embodiment of the present invention.

FIG. 3 is a diagram showing a time waveform of a TCCH signal.

FIG. 5 is a diagram showing a correlation value between a demodulated complex symbol and a TCCH complex symbol.

FIG. 7 is a flowchart showing an operation of a state acquisition section according to the embodiment of the present invention.

EMBODIMENT FOR CARRYING OUT THE INVENTION

Figure 2:
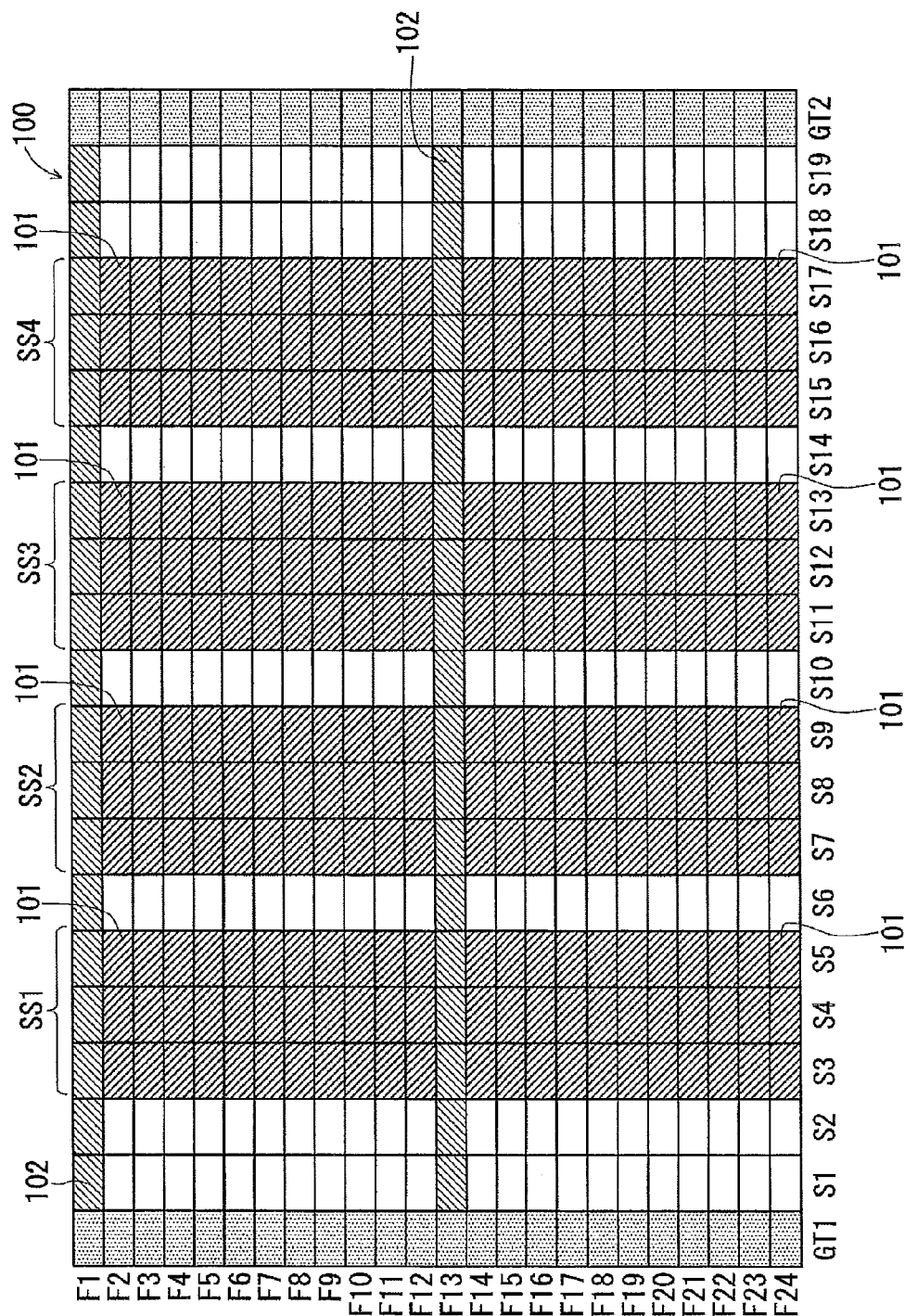
FIG. 2 is a diagram showing a configuration of a PRU for a TCCH.

FIG. 1 is a diagram showing a configuration of a communication device 1 according to an embodiment of the present invention. The communication device 1 is, for example, a base station in conformity with a next-generation PHS specified in the Non-Patent Document 1 mentioned above. The communication device 1 performs bi-directional wireless communication with a plurality of communication terminals (not shown) by using the OFDMA scheme. The communication device 1 individually allocates a radio resource specified by two dimensions configured with a time axis and a frequency axis to each of the plurality of communication terminals, and thereby can perform simultaneous communication with the plurality of communication terminals.

As shown in FIG. 1, the communication device 1 includes a wireless communication section 2 having a reception section 20 and a transmission section 21, an A/D converter 12, filters 3 and 11, an FFT processing section 4, a sort processing section 5, a channel estimate section 6, an equalizer 7, a detection section 8, a data processing section 9, an IFFT processing section 10, and a D/A converter 13. The reception section 20 and the transmission section 21 share a transmission/reception antenna 23.

The reception section 20 performs an amplification process and down-conversion on an OFDM signal received by the transmission/reception antenna 23 to convert the OFDM signal into a baseband signal, and outputs the baseband signal. The A/D converter 12 converts the analog baseband signal outputted from the reception section 20 into a digital baseband signal.

The filter 3 is a band-pass filter that filters the baseband signal outputted from the A/D converter 12, and outputs a resulting signal. The FFT processing section 4 performs an FFT process on the baseband signal filtered by the filter 3, to separate and output a plurality of subcarriers included in the baseband signal. More specifically, the FFT processing section 4 outputs a complex symbol for modulating a subcarrier with respect to each of the plurality of subcarriers included in the baseband signal.

The sort processing section 5 rearranges the complex symbols for the subcarriers outputted from the FFT processing section 4 in the order of subcarrier frequencies, and outputs them. The channel estimate section 6 estimates characteristics of a transmission path between the communication device 1 (base station) and the communication terminal based on the complex symbol outputted from the sort processing section 5. The equalizer 7 corrects the complex symbol outputted from the sort processing section 5 based on a result of the estimate of the channel estimate section 6. As a result, distortion caused by the characteristics of the transmission path which is included in the complex symbol is removed. The data processing section 9 performs a descrambling process, a Viterbi decoding process, and the like, on the corrected complex symbol, and recovers bit data transmitted from the communication terminal.

The data processing section 9 also generates transmission data to be transmitted to the communication terminal, and generates a plurality of complex symbols corresponding to the generated transmission data. The data processing section 9 performs a convolutional encoding process, a scrambling process, and the like, on the plurality of complex symbols generated, and inputs resulting symbols to the IFFT processing section 10. The IFFT processing section 10 performs an IFFT (Inverse FFT) process on the plurality of complex symbols inputted, and outputs a baseband signal obtained by combining the plurality of subcarriers modulated by the plurality of complex symbols.

The filter 11 filters the baseband signal outputted from the IFFT processing section 10, and outputs a resulting signal. The D/A converter 13 converts the digital baseband signal outputted from the filter 11 into an analog baseband signal. The transmission section 21 performs up-conversion and an amplification process on the baseband signal outputted from the D/A converter 13, and then inputs a resulting signal to the transmission/reception antenna 23. Thus, a radio signal is transmitted from the transmission/reception antenna 23 to the communication terminal.

The detection section 8 detects a delay amount behind the reference timing, of a timing of receiving a signal from the communication terminal that is not synchronized with the communication device 1, and also detects a reception level of the signal from the communication terminal. The data processing section 9 sets the delay amount detected by the detection section 8 as a correction amount for a transmission timing of the communication terminal. The data processing section 9 also determines an appropriate transmission level of the communication terminal based on the reception level detected by the detection section 8. Then, the data processing section 9 generates transmission data containing information for notifying the communication terminal of the correction amount and information for notifying the communication terminal of the determined transmission level. The transmission data is, as a radio signal, transmitted from the transmission/reception antenna 23 to the communication terminal.

When the correction amount for the transmission timing is notified by the communication device 1, each communication terminal corrects the transmission timing based on the correction amount. This enables the communication device 1 to receive a signal from each communication terminal at an appropriate timing. As a result, in the communication device 1, the FFT processing section 4 can perform at an appropriate timing the FFT process on the signal supplied from each communication terminal, and the orthogonality of the signals supplied from the plurality of communication terminals can be ensured. Thus, the communication device 1 can correctly obtain information contained in the signal supplied from each communication partner device.

When the transmission level is notified by the communication device 1, each communication terminal transmits a signal in accordance with the transmission level. Thereby, in the communication device 1, the signal supplied from each communication terminal has an appropriate reception level, so that the reception section 20 can appropriately process the signal supplied from each communication terminal. Moreover, in the communication device 1, the signals supplied from the plurality of communication terminals have uniform reception levels, so that an OFDM signal made up of these signals has flat frequency characteristics. Therefore, the communication device 1 can correctly obtain information contained in the signal supplied from each communication partner device.

Here, in the next-generation PHS, communication between a base station and a communication terminal is performed on a PRU (Physical Resource Unit) basis. For example, the base station allocates a radio resource to the communication terminal on a PRU basis, and a modulation scheme used for transmitting transmission data to the communication terminal is determined for each PRU. One PRU is represented by one sub-channel having a bandwidth of 900 kHz and one slot having a time interval of 625 μs One sub-channel includes 24 subcarriers.

When the communication between the communication device 1 and the communication terminal is started, the detection section 8 obtains the above-mentioned delay amount and reception level based on a known signal that is transmitted by the communication terminal using a TCCH (Timing Correct Channel). FIG. 2 is a diagram showing an example of configuration of a PRU 100 for the TCCH. In FIG. 2, the horizontal direction and the vertical direction represent the time and the frequency, respectively. In FIG. 2, the reference characters S1 to S19 denote the numbers for symbol periods, and the reference characters F1 to F24 denote the frequency numbers for subcarriers.

The PRU 100 is expressed in two dimensions including a time axis and a frequency axis. As shown in FIG. 2, the PRU 100 includes a plurality of TCCH symbols 101 and a plurality of null symbols 102. In the PRU 100, a first guard time GT1 and a second guard time GT2 are provided at the head and the end in the time axis direction. In the PRU 100, three consecutive symbol periods S3 to S5 form a first sub-slot SS1, three consecutive symbol periods S7 to S9 form a second sub-slot SS2, three consecutive symbol periods S11 to S13 form a third sub-slot SS3, and three consecutive symbol periods S15 to S17 form a fourth sub-slot SS4. The subcarriers in the first sub-slot SS1 to the fourth sub-slot SS4 and at the frequencies F2 to F12 and F13 to F24 are the TCCH symbols 101. The subcarrier at the frequency F1 is a guard carrier, and the subcarrier at the frequency F13 is a DC carrier. The guard carriers and the DC carriers in the symbol periods S1 to S19 are null symbols 102.

The communication terminal transmits a known TCCH signal to the communication device 1 by using a plurality of TCCH symbols 101 in any one sub-slot SSn (1≤n≤4) from the first sub-slot SS1 to the fourth sub-slot SS4 specified based on the timing of the communication terminal itself. Hereinafter, of the three symbol periods forming one sub-slot SSn, the leading symbol period Sk (k=3, 7, 11, 15), the next symbol period S(k+1), and the final symbol period S(k+2) will be sometimes referred to as "leading symbol period", "middle symbol period", and "last symbol period", respectively.

FIG. 3 is a diagram showing a time waveform of a TCCH signal 200. In FIG. 3, for the convenience of the description, the TCCH signal 200 is shown in a sine wave. However, the actual time waveform is not a sine wave, because the TCCH signal 200 is an OFDM signal in which a plurality of subcarriers having different frequencies are combined.

As shown in FIG. 3, each symbol period of the next-generation PHS includes a guard interval GI and an effective symbol period ES. In each symbol period, a part of a signal in the last ⅛ of the effective symbol period ES is included in the guard interval GI located at the head. Therefore, the time waveform of the signal is continuous in the symbol periods.

In addition, in the next-generation PHS, in one sub-slot SSn where the TCCH signal 200 is transmitted, the time waveform of the subcarrier at each of the frequencies F2 to F12 and F14 to 24 forms a sine wave that is continuous through all the periods. As a result, as shown in FIG. 3, a signal obtained by combining the subcarriers at the frequencies F2 to F12 and F14 to 24, the guard carrier, and the DC subcarrier, that is, the TCCH signal 200, has a continuous time waveform in one sub-slot SSn where the TCCH signal 200 is transmitted.

In the TCCH signal 200, the subcarriers (22 subcarriers) at the frequencies F2 to F12 and F14 to 24 in the effective symbol period ES of the last symbol period are modulated by a TCCH symbol pattern configured with a plurality of known complex symbols. More specifically, the 22 subcarriers in the effective symbol period ES in the last symbol period are modulated by 22 known complex symbols configuring the TCCH symbol pattern, respectively. In the TCCH signal 200, from the end of the last symbol period to the beginning of the leading symbol period, three and three-eighth partial signals 200a (a part modulated by the TCCH symbol pattern; hereinafter referred to as "TCCH pattern signal 200a") continuously exist. The partial signal 200a is a signal in the effective symbol period ES of the last symbol period. That is, in one sub-slot SSn where the TCCH signal 200 is transmitted, the TCCH pattern signal 200a is repeatedly transmitted so as to form a continuous time waveform.

In such a TCCH signal 200, whatever part of the signal of the effective symbol length is sampled by the FFT processing section 4, the orthogonality of the sampled subcarriers is maintained, and the TCCH symbol pattern can be obtained by the FFT processing section 4. However, depending on a sampled part, the TCCH symbol pattern obtained by the FFT processing section 4 sometimes causes a phase rotation in comparison to the original TCCH symbol pattern.

In the next-generation PHS, six types of TCCH symbol patterns are specified. Therefore, there are six types of TCCH signals 200 and six types of TCCH pattern signals 200a. Each communication terminal transmits one of the six types of TCCH signals 200 in one sub-slot SSn. Hereinafter, each of the plurality of complex symbols configuring the TCCH symbol pattern will be referred to as "TCCH complex symbol".

Here, in the next-generation PHS, an operation timing of the base station serves as the reference timing for the communication between the base station and the communication terminal. Accordingly, if the communication device 1 and the communication terminal are not synchronized with each other, the signal from the communication terminal may not be inputted to the FFT processing section 4 of the communication device 1 at an appropriate timing. As a result, the communication device 1 may not appropriately demodulate the signal supplied from the communication terminal, and thus cannot correctly obtain information contained in the signal.

Therefore, in the communication device 1 according to this embodiment, the detection section 8 detects the delay amount of the timing of receiving the TCCH signal 200 that is transmitted from the communication terminal, and the data processing section 9 sets the delay amount as the correction amount for the transmission timing of the communication terminal.

Moreover, in the communication device 1, if the reception level of the signal supplied from the communication terminal does not have an appropriate value, the information contained in the signal of the communication terminal cannot be correctly obtained. In the communication device 1 according to this embodiment, the detection section 8 detects the reception level, at the communication device 1, of the TCCH signal 200 transmitted from the communication terminal, and the data processing section 9 determines an appropriate transmission level of the communication terminal based on the detected reception level.

In the following, a configuration and an operation of the detection section 8 will be described in detail.

Figure 4:
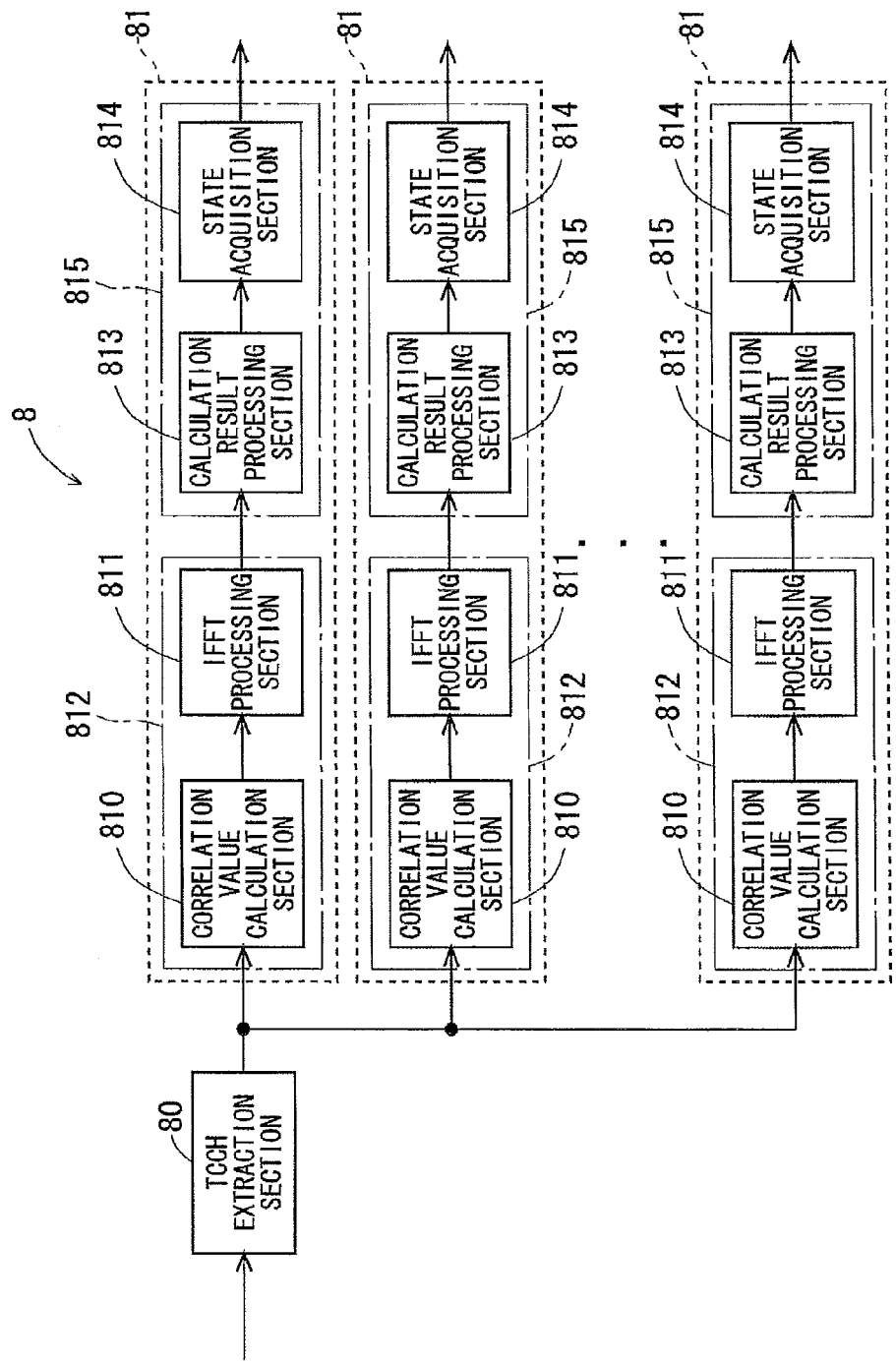
FIG. 4 is a diagram showing a configuration of a detection section according to the embodiment of the present invention.

FIG. 4 is a diagram showing a configuration of the detection section 8. As shown in FIG. 4, the detection section 8 includes a TCCH extraction section 80, and six TCCH processing sections 81 each corresponding to each of the six TCCH symbol patterns. The TCCH extraction section 80 extracts, from the output signal of the FFT processing section 4, the complex symbol of each subcarrier in the symbol periods S1 to S19 in the PRU 100 for the TCCH. Hereinafter, the complex symbol extracted by the TCCH extraction section 80 will be referred to as "demodulated complex symbol".

Each of the TCCH processing sections 81 includes a correlation calculation section 812 that calculates the correlation between the TCCH symbol pattern corresponding to the TCCH processing section 81 and the demodulated complex symbol, and a reception state acquisition section 815 that obtains a delay amount of a timing of receiving a signal from the communication terminal and a reception level of the signal based on a result of calculation in the correlation calculation section 812. The correlation calculation section 812 includes a correlation value calculation section 810 and an IFFT processing section 811, and the reception state acquisition section 815 includes a calculation result processing section 813 and a state acquisition section 814.

The correlation value calculation section 810 obtains, from the plurality of demodulated complex symbols extracted by the TCCH extraction section 80, demodulated complex symbols for the subcarriers at the frequencies F1 to F12 and F14 to F24 in the last symbol period of one sub-slot SSn. Then, the correlation value calculation section 810 obtains a correlation value of correlation between a demodulated complex symbol pattern made up of the plurality of obtained demodulated complex symbols and the TCCH symbol pattern of one type corresponding to the TCCH processing section 81 that includes this correlation value calculation section 810. More specifically, the correlation value calculation section 810 obtains a correlation value of correlation between a demodulated complex symbol and a TCCH complex symbol for modulating the subcarrier at the same frequency as the demodulated complex symbol, with respect to each of the plurality of demodulated complex symbols in the last symbol period.

FIG. 5 is a diagram for explaining a method for obtaining the correlation value. Assuming that a demodulated complex symbol for a subcarrier in the frequency number Fm (m=1 to 12, 14 to 24) is (am+jbm) and a TCCH complex symbol for the subcarrier is (cm+jdm), the correlation value calculation section 810 obtains, as the correlation value, a complex number (am+jbm)·(cm−jbm) obtained by multiplying (am+jbm) by (cm−jbm). Thus, for the last symbol period, 22 correlation values of correlation between the demodulated complex symbols and the TCCH complex symbols are obtained.

The correlation value calculation section 810 similarly obtains a correlation value of correlation between a demodulated complex symbol and a TCCH complex symbol for modulating the subcarrier at the same frequency as the demodulated complex symbol, with respect to each of the plurality of demodulated complex symbols in a symbol period S(k+3) that continuously follows the last symbol period S(k+2), for example, in the symbol period S6 that continuously follows the last symbol period S5 of the first sub-slot SS1. As a result, there are obtained 22 correlation values of correlations between the demodulated complex symbols and the TCCH complex symbols in the symbol period S(k+3) that continuously follows the last symbol period S(k+2).

The correlation value calculation section 810 calculates the correlation value in the above-described manner with respect to each of the first sub-slot SS1 to the fourth sub-slot SS4. Therefore, each correlation value calculation section 810 obtains correlation values in the last symbol period S5 of the first sub-slot SS1 and in the subsequent symbol period S6. Additionally, each correlation value calculation section 810 obtains correlation values in the last symbol period S9 of the second sub-slot SS2 and in the subsequent symbol period S10, and correlation values in the last symbol period S13 of the third sub-slot SS3 and in the subsequent symbol period S14. Moreover, the correlation value calculation section 810 obtains correlation values in the last symbol period S17 of the fourth sub-slot SS4 and in the subsequent symbol period S18.

The communication terminal transmits the TCCH symbol pattern in any sub-slot SSn from the first sub-slot SS1 to the fourth sub-slot SS4. Therefore, by obtaining the above-described correlation values in each of the first sub-slot SS1 to the fourth sub-slot SS4, the communication device 1 can obtain a correlation value of correlation between the TCCH symbol pattern received from the communication terminal and an ideal TCCH symbol pattern.

The IFFT processing section 811 performs an IFF process on the correlation value obtained by the correlation value calculation section 810. More specifically, the IFFT processing section 811 performs the IFFT process on the 22 correlation values in the last symbol period and also performs the IFFT process on the 22 correlation values in the symbol period subsequent to that last symbol period, in each of the first sub-slot SS1 to the fourth sub-slot SS4.

In this embodiment, the number of samples (the number of points) of the IFFT is 128 for example, and thus the necessary number of inputs to the IFFT processing section 811 is 128. Therefore, the 22 correlation values and 106 zero values are inputted to the IFFT processing section 811. As a result, 128 sample values arranged in chronological order are outputted from the IFFT processing section 811. In this embodiment, the 128 sample values outputted from the IFFT processing section 811 and arranged in chronological order are given sample numbers 0 to 127, respectively.

The sample value outputted from the IFFT processing section 811 represents a correlation value of correlation between the demodulated complex symbol pattern and a delay TCCH symbol pattern obtained as a result of a phase rotation of the TCCH symbol pattern. To be specific, when the effective symbol length is defined as T, the sample value of the sample number l (0≤l≤127) represents a correlation value of correlation between the demodulated complex symbol pattern and a delay TCCH symbol pattern obtained as a result of rotating the phase of the TCCH symbol pattern by an amount corresponding to (T×l/128). That is, the sample value of the sample number l is the sum of correlation values of correlations between the plurality of demodulated complex symbols and the plurality of delay TCCH complex symbols obtained as a result of rotating the phases of the plurality of TCCH complex symbols included in the TCCH symbol pattern by the amount corresponding to (T×l/128). When the delay TCCH complex symbol for the subcarrier at the frequency number Fm is defined as (ccm+jddm), the sample value SMP1 of the sample number 1 is represented by the following expression (1).

$$SMP1 = (a1+jb1)\cdot(cc1-jdd1) + (a2+jb2)\cdot(cc2-jdd2) + \ldots \\ + (a12+jb12)\cdot(cc12-jdd12) + (a14+jb14) + (cc14- \\ jdd14) + (a15+jb15)\cdot(cc15-jdd15) + \ldots + (a24+ \\ jb24)\cdot(cc24-jdd24) \quad (1)$$

The sample value SMP0 of the sample number 0 is the sum of correlation values of correlations between the plurality of original TCCH complex symbols and the plurality of demodulated complex symbols.

The IFFT processing section 811 obtains 128 sample values in the last symbol period S(k+2) and 128 sample values in the symbol period S(k+3) that follows the last symbol period S(k+2), with respect to each of the first sub-slot SS1 to the fourth sub-slot SS4. In other words, each IFFT processing section 811 obtains eight sets of 128 sample values in accordance with the TCCH symbol pattern corresponding thereto.

Figure 6:
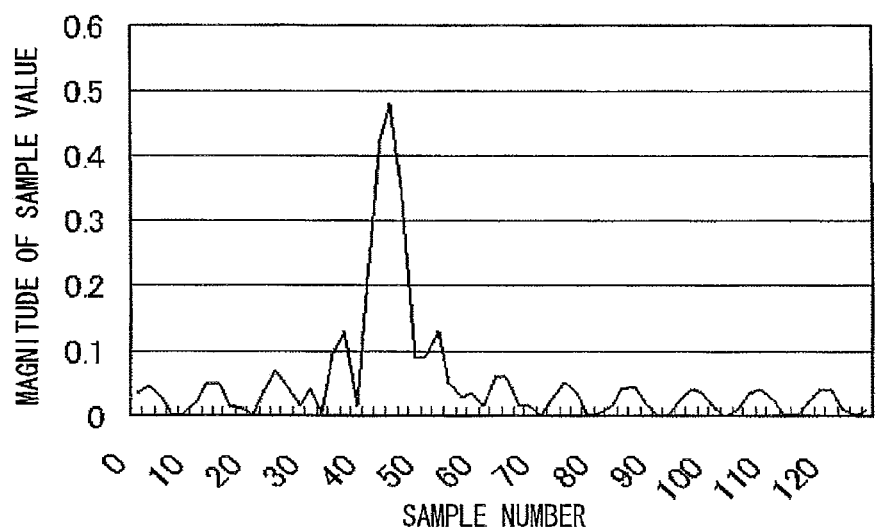
FIG. 6 is a diagram showing a graph of the correlation value.

The calculation result processing section 813 obtains the magnitude of each of the 128 sample values in each set of the sample values obtained by the IFFT processing section 811. To be specific, when the sample value SMP1 is defined as (e1+jf1), the calculation result processing section 813 obtains $(e1^2+f1^2)$ as the magnitude of the sample value SMP1. FIG. 6 is a diagram showing an example of the magnitudes of the 128 sample values in one set. In FIG. 6, the horizontal axis represents the sample number, and the vertical axis represents the magnitude of the sample value. Hereinafter, a graph showing 128 sample values in a single symbol period as in FIG. 6 will be referred to as "correlation value graph".

The calculation result processing section 813 obtains the magnitudes of all the sample values in each set of sample values, and then, with respect to each of the first sub-slot SS1 to the fourth sub-slot SS4, obtains a peak value (maximum value) of the magnitudes of the 128 sample values in the last symbol period S(k+2), and identifies the sample number (hereinafter referred to as "peak position") of the sample value having the magnitude of the peak value. In an example shown in FIG. 6, since the sample value of the sample number 50 exhibits the peak magnitude, the peak position is "50".

The calculation result processing section 813 also obtains a peak value of the magnitudes of the 128 sample values in the symbol period S(k+3) that follows the last symbol period S(k+2), with respect to each of the first sub-slot SS1 to the fourth sub-slot SS4.

Furthermore, the calculation result processing section 813 obtains an average value (hereinafter simply referred to as "average value") of the 128 sample values in the last symbol period S(k+2), with respect to each of the first sub-slot SS1 to the fourth sub-slot SS4.

The state acquisition section 814 obtains a delay amount of a timing of receiving a signal from the communication terminal and a reception level of the signal, based on the peak value, the peak position, and the average value obtained by the calculation result processing section 813. In the following, an operation of the state acquisition section 814 will be described in detail with reference to FIGS. 7 and 8.

FIG. 7 is a flowchart showing a process performed by the state acquisition section 814 using the peak value, the peak position, and the average value in one sub-slot SSn.

Figure 8:
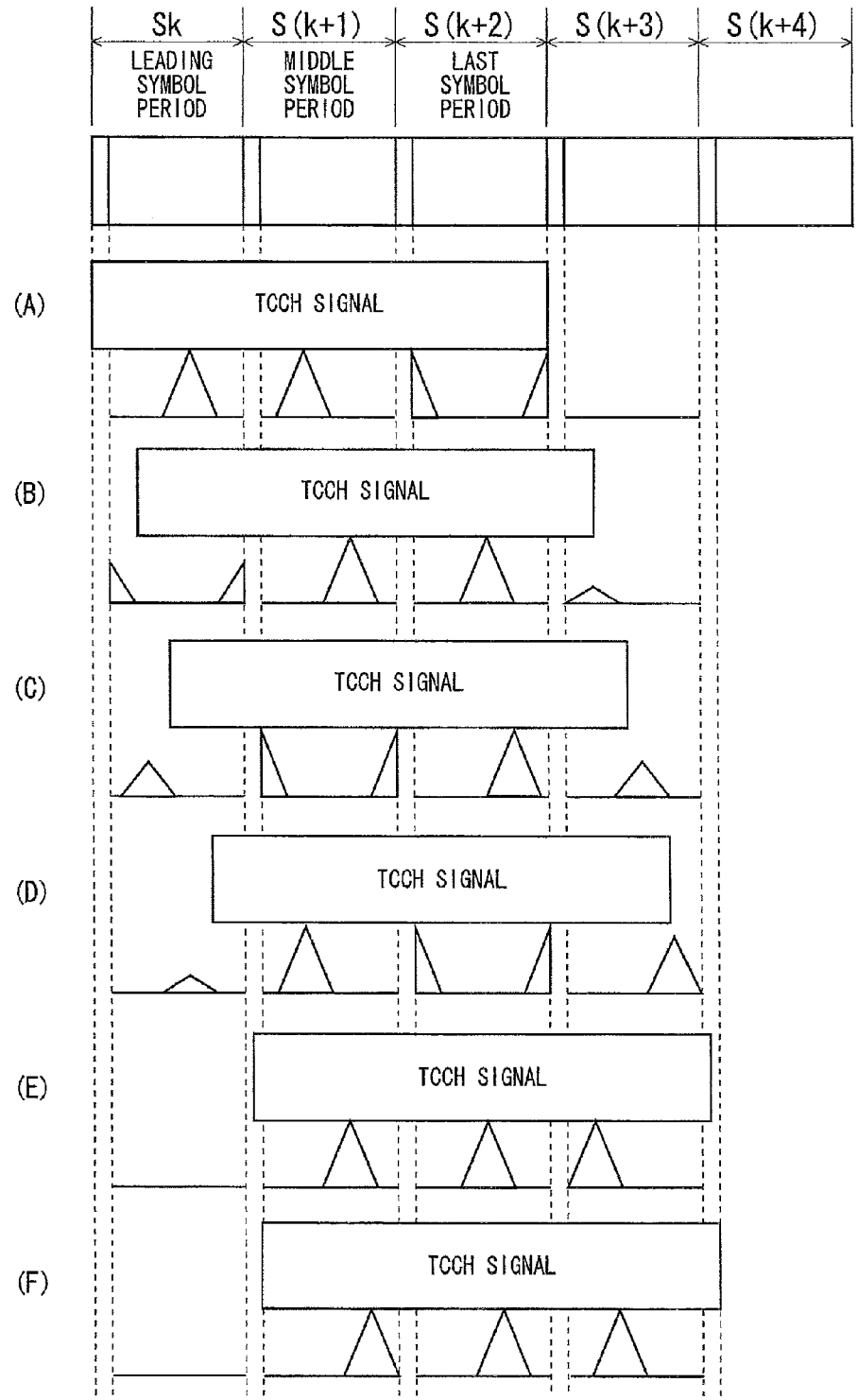
FIG. 8 is a diagram showing a timing of receiving the TCCH signal.

FIG. 8 is a diagram showing various timings of receiving the TCCH signal. In FIG. 8, the symbol periods Sk to S(k+4) specified based on the timing of the communication device 1 are shown in the top. In FIG. 8, a reception timing (A) indicates a state where the timing of receiving the TCCH signal from the communication terminal has substantially no delay in the communication device 1. In FIG. 8, reception timings (B) to (F) indicate states where the timing of receiving the TCCH signal from the communication terminal is delayed in the communication device 1. The delay amount of the timing of receiving the TCCH signal increases in the order of the reception timings (B) to (F). In the reception timings (E) and (F), the timing of receiving the TCCH signal is delayed by one-symbol period or longer. In FIG. 8, under each TCCH signal, a correlation value graph in the symbol periods Sk to S(k+3) in a case where the TCCH signal is received at the reception timing shown in FIG. 8 is shown.

As shown in FIG. 7, in step ST1, the state acquisition section 814 determines whether or not a peak value (in FIG. 7, represented as a peak value (S(k+2))) in a last symbol period S(k+2) of one sub-slot SSn to be processed is sufficiently larger than an average value (in FIG. 7, represented as an average value (S(k+2))) in the last symbol period S(k+2). To be specific, the state acquisition section 814 determines whether or not the peak value in the last symbol period S(k+2) is larger than a value of α(α>1) times the average value in the last symbol period S(k+2). If the peak value is not sufficiently larger than the average value in the symbol period S(k+2), it can be determined that there is no delay TCCH complex symbol pattern correlated with the demodulated complex symbol pattern in the last symbol period S(k+2). In this case, therefore, the state acquisition section 814 determines that no TCCH signal is received from the communication terminal in the one sub-slot SSn to be processed, or that the TCCH symbol pattern included in the received TCCH signal is not a symbol pattern corresponding to the TCCH processing section 81 that includes this state acquisition section 814, and then terminates the process on the one sub-slot SSn. On the other hand, if the peak value is sufficiently larger than the average value in the last symbol period S(k+2), it means that there is a delay TCCH complex symbol pattern correlated with the demodulated complex symbol pattern in the last symbol period S(k+2). Therefore, the state acquisition section 814 determines that a TCCH signal is received from the communication terminal in one sub-slot SSn to be processed, and execute the following step ST2.

In step ST2, the state acquisition section 814 sets the peak value in the last symbol period S(k+2) as the reception level of the TCCH signal supplied from the communication terminal. After executing step ST2, the state acquisition section 814 determines, in step ST3, whether or not a peak position (in FIG. 7, represented as a peak position (S(k+2))) in the last symbol period S(k+2) is higher than 16 and lower than 111. If the state acquisition section 814 determines that the peak position in the last symbol period S(k+2) is 16 or lower, or is 111 or higher, the state acquisition section 814 determines that the reception state of the TCCH signal is (A) or (D) of FIG. 8, and executes step ST4. On the other hand, if the state acquisition section 814 determines that the peak position in the last symbol period S(k+2) is higher than 16 and lower than 111, the state acquisition section 814 determines that the timing of receiving the TCCH signal is any of (B), (C), (E), and (F) of FIG. 8, and executes step ST5.

In step ST4, the state acquisition section 814 determines whether or not a peak value (in FIG. 7, represented as a peak value (S(k+3))) in the symbol period S(k+3) that follows the last symbol period S(k+2) is small. More specifically, the state acquisition section 814 determines whether or not a value of $\beta(\beta>1)$ times the peak value in the symbol period S(k+3) is smaller than the peak value in the last symbol period S(k+2). If the state acquisition section 814 determines that the peak value in the symbol period S(k+3) is small, the state acquisition section 814 determines that the timing of receiving the TCCH signal is (A) of FIG. 8, in other words, that the TCCH signal does not enter the symbol period S(k+3), and executes step ST6.

On the other hand, if the state acquisition section 814 determines that the peak value in the symbol period S(k+3) is not small, the state acquisition section 814 determines that the timing of receiving the TCCH signal is (D) of FIG. 8, in other words, that the TCCH signal enters the symbol period S(k+3), and executes step ST7.

In step ST6, the state acquisition section 814 determines whether or not the peak position in the last symbol period S(k+2) is higher than 16. Here, if there is substantially no delay in the timing of receiving the TCCH signal as shown in (A) of FIG. 8, the peak position in the last symbol period S(k+2) takes an ideal value close to zero which is the minimum value, or a value close to 127 which is the maximum value. In step ST6, which of the values the peak position in the last symbol period S(k+2) takes is determined. If the state acquisition section 814 determines that the peak position in the last symbol period S(k+2) is larger than 16, then in step ST8, the state acquisition section 814 sets a delay amount of the timing of receiving the TCCH signal to be zero.

On the other hand, if the state acquisition section 814 determines that the peak position in the last symbol period S(k+2) is 16 or lower, then in step ST9, the state acquisition section 814 sets the peak position in the last symbol period S(k+2) as the delay amount of the timing of receiving the TCCH signal. As described above, when the effective symbol length is defined as T, the sample value of the sample number 1 outputted from the IFFT processing section 811 represents a correlation value of correlation between the demodulated complex symbol pattern and the delay TCCH symbol pattern obtained by rotating the phase of the TCCH symbol pattern by the amount corresponding to (T×1/128). Accordingly, when the peak position in the last symbol period S(k+2) is defined as L, the demodulated complex symbol pattern in the last symbol period S(k+2) is correlated with the delay TCCH symbol pattern obtained by rotating the phase of the TCCH symbol pattern by the amount corresponding to (T×L/128). Therefore, in terms of a time region, the timing of receiving the TCCH signal is delayed by (T×L/128). Thus, the peak position indicates the delay amount of the timing of receiving the TCCH signal.

If, in step ST4 described above, the state acquisition section 814 determines that the timing of receiving the TCCH signal is in the state (D) of FIG. 8, then in step ST7, the state acquisition section 814 determines whether or not the peak position in the last symbol period S(k+2) is smaller than 111. In a case where the delay amount of the TCCH signal is substantially equal to the effective symbol length T as shown in (D) of FIG. 8, the peak position in the last symbol period S(k+2) takes an ideal value close to the maximum value "127", or a value close to zero which is the minimum value. In step ST7, which of the values the peak position in the last symbol period S(k+2) takes is determined. If the state acquisition section 814 determines that the peak position in the last symbol period S(k+2) is lower than 111, then in step ST10, the state acquisition section 814 sets the delay amount of the timing of receiving the TCCH signal to be "127". On the other hand, if the state acquisition section 814 determines that the peak position in the last symbol period S(k+2) is 111 or higher, the state acquisition section 814 executes step ST9 described above, and sets the peak position in the last symbol period S(k+2) as the delay amount of the timing of receiving the TCCH signal.

If, in step ST3, the state acquisition section 814 determines that the timing of receiving the TCCH signal is any of (B), (C), (E), and (F) of FIG. 8, then in step ST5, the state acquisition section 814 determines whether or not a peak value in the symbol period S(k+3) that follows the last symbol period S(k+2) is large. More specifically, similarly to step ST4, the state acquisition section 814 determines whether or not a value of f3 times the peak value in the symbol period S(k+3) is smaller than the peak value in the last symbol period S(k+2). If the state acquisition section 814 determines that the peak value in the symbol period S(k+3) is not large, in other words, that the value of β times the peak value in the symbol period S(k+3) is smaller than the peak value in the last symbol period S(k+2); the state acquisition section 814 determines that the timing of receiving the TCCH signal is in either one state of (B) and (C) of FIG. 8, in other words, that the TCCH signal does not enter the symbol period S(k+3) to a high degree, so that the delay of the TCCH signal is within an one-symbol period. Thus, the state acquisition section 814 executes step ST9 described above, and sets the peak position in the last symbol period S(k+2) as the delay amount of the timing of receiving the TCCH signal.

On the other hand, if the state acquisition section 814 determines that the peak value in the symbol period S(k+3) is large, in other words, that the value of f3 times the peak value in the symbol period S(k+3) is larger than the peak value in the last symbol period S(k+2), the state acquisition section 814 determines that the timing of receiving the TCCH signal is in either one state of (E) and (F) of FIG. 8, in other words, that the TCCH signal is delayed by the one-symbol period or longer, and executes step ST11.

In step ST11, the state acquisition section 814 sets, as the delay amount of the timing of receiving the TCCH signal, a value obtained by adding "128" which corresponds to the effective symbol length to the peak position in the last symbol period S(k+2).

Here, in a case where the TCCH signal is delayed by the one-symbol period, in terms of the time region, a waveform (a waveform in the effective symbol period ES of the middle symbol period in FIG. 3) of the TCCH signal in the last symbol period S(k+2) is ahead of the TCCH pattern signal 200*a* by the time period equal to the guard interval GI. Accordingly, in a case where the TCCH signal is delayed by the one-symbol period, the peak position in the last symbol period S(k+2) is higher, by an amount equal to the guard interval GI, than the peak position in the last symbol period S(k+2) in a case where there is no delay in the timing of receiving the TCCH signal. Therefore, if it is determined that the TCCH signal is delayed by the one-symbol period or longer, the state acquisition section 814 adds, instead of the value corresponding to the one-symbol period, the value "128" corresponding to the effective symbol length, to the peak position in the last symbol period S(k+2).

If, in step ST1, the state acquisition section 814 determines that the peak value in the last symbol period S(k+2) is not sufficiently larger than the average value, then the state acquisition section 814 changes one sub-slot SSn to be processed and performs the same process.

The data processing section 9 sets the delay amount obtained by the state acquisition section 814, as a correction amount for the transmission timing of the communication terminal. The data processing section 9 also determines a transmission level of the communication terminal based on the reception level obtained by the state acquisition section 814. That is, the data processing section 9 functions as a determination section that determines the transmission level of the communication terminal. Then, the data processing section 9 generates transmission data containing information for notifying the communication terminal of the correction amount and information for notifying the communication terminal of the determined transmission level. The transmission data is, as a radio signal, transmitted from the transmission/reception antenna 23 of the transmission section 21 to the communication terminal.

As described above, in the communication device 1 according to this embodiment, the correlation calculation section 812 calculates the correlation between the demodulated complex symbol pattern (a frequency component of a signal received by the reception section 20) and the TCCH symbol pattern (a frequency component of a known TCCH pattern signal 200a) in each of the last symbol period S(k+2) which is one unit time period and the symbol period S(k+3) which is a unit time period subsequent thereto. Then, based on the result of the calculation in the correlation calculation section 812, the reception state acquisition section 815 obtains the delay amount of the timing of receiving the signal from the communication terminal.

As shown in FIG. 8, as the delay amount of the timing of receiving the TCCH signal 200 increases, a part of the TCCH signal 200 received in the symbol period S(k+3) becomes larger. Accordingly, based on the result of the calculation of the correlation between the demodulated complex symbol pattern and the TCCH symbol pattern in the symbol period S(k+3), as described in step ST5 above, whether or not the TCCH signal 200 is delayed by the one-symbol period or longer can be detected. In step ST5 described above, if the peak value, which is the result of calculation of the correlation between the demodulated complex symbol pattern and the TCCH symbol pattern in the symbol period S(k+3), is large, it is determined that the TCCH signal 200 is delayed by the one-symbol period or longer.

The TCCH signal 200 transmitted from the communication terminal is a continuous waveform in which the TCCH pattern signal 200a is repeated during a single sub-slot SSn. Therefore, in the communication device 1, even if the timing of receiving the TCCH signal 200 is delayed by the one-symbol period or longer, the TCCH signal 200 is continuously received in the last symbol period S(k+2). This allows an appropriate calculation of the correlation between the demodulated complex symbol pattern and the TCCH symbol pattern in the last symbol period S(k+2). Thus, based on the result of the calculation of the correlation and the result of the determination of whether or not the TCCH signal 200 is delayed by the one-symbol period or longer, a delay of the one-symbol period or longer in the timing of receiving the signal from the communication terminal can be obtained (step ST9, ST11). As a result, the delay amount of the timing of receiving the signal from the communication terminal can be detected with an improved accuracy.

<Modification of Combination of Symbol Periods to be Processed>

In the above-described example, the result of the calculation of the correlation between the demodulated complex symbol pattern and the TCCH symbol pattern in the symbol period S(k+3) that follows one sub-slot SSn is used for determining whether or not the timing of receiving the signal from the communication terminal is delayed by the one-symbol period or longer. Instead, a result of calculation of the correlation between the demodulated complex symbol pattern and the TCCH symbol pattern in the leading symbol period Sk of one sub-slot SSn may be used. As shown in FIG. 8, as the delay amount of the timing of receiving the TCCH signal 200 increases, a part of the TCCH signal 200 received in the leading symbol period Sk becomes smaller. Accordingly, based on the result of the calculation of the correlation between the demodulated complex symbol pattern and the TCCH symbol pattern in the leading symbol period Sk, whether or not the TCCH signal 200 is delayed by the one-symbol period or longer can be detected. For example, the correlation calculation section 812 obtains a peak value in the leading symbol period Sk and if the peak value is small, determines that the TCCH signal 200 is delayed by the one-symbol period or longer.

Moreover, instead of using the result of the calculation of the correlation between the demodulated complex symbol pattern and the TCCH symbol pattern in the last symbol period S(k+2), a result of calculation of the correlation between the demodulated complex symbol pattern and the TCCH symbol pattern in the middle symbol period S(k+1) may be used. In the communication device 1, in a case where the timing of receiving the TCCH signal 200 is delayed by the one-symbol period, the TCCH signal 200 can be continuously received in the middle symbol period S(k+1). Moreover, in the communication device 1, even if the delay in the timing of receiving the TCCH signal 200 is slightly longer than the one-symbol period, the TCCH signal can be continuously received in a major part of the middle symbol period S(k+1). Accordingly, the correlation between the demodulated complex symbol pattern and the TCCH symbol pattern in the middle symbol period S(k+1) can be appropriately calculated. In a case of using the result of the calculation of the correlation between the demodulated complex symbol pattern and the TCCH symbol pattern in the middle symbol period S(k+1), the correlation calculation section 812 obtains a peak position in the middle symbol period S(k+1) and if it is determined that the TCCH signal 200 is delayed by the one-symbol period or longer, the value "128" is added to the peak position, and thereby a delay amount can be obtained. However, even if there is no delay in the timing of receiving the TCCH signal 200, as shown in FIG. 3, a signal waveform of the TCCH signal 200 in the effective symbol period ES of the middle symbol period S(k+1) is ahead of the TCCH pattern signal 200a by a time period equal to the guard interval GI. Thus, the delay amount obtained in this manner is larger than the actual delay amount by the amount corresponding to the guard interval GI. Therefore, in a case of using the peak position in the middle symbol period S(k+1), a correction for subtracting the amount corresponding to the guard interval GI from the delay amount obtained is necessary.

Additionally, by calculating the correlation between the demodulated complex symbol pattern and the TCCH symbol pattern with respect to each of the leading symbol period Sk, the middle symbol period S(k+1), and the last symbol period S(k+2) included in one sub-slot SSn, and obtaining a delay amount of the timing of receiving the signal from the communication terminal based on these correlation calculations, a delay of a two-symbol period or longer in the reception timing can be detected. It is desirable that at least two symbol periods to be subjected to the correlation calculation is configured with the leading symbol period Sk and a plurality of symbol periods subsequent thereto. If a delay amount of the timing of receiving the TCCH signal 200 increases, a part of the TCCH signal 200 received in the leading symbol period Sk firstly decreases. Then, if the delay amount further increases, a part of the TCCH signal 200 received in the middle symbol period S(k+1) decreases. Therefore, by using a result of the calculation of the correlation between the demodulated complex symbol pattern and the TCCH symbol pattern in the leading symbol period Sk and a result of the calculation of the correlation between the demodulated complex symbol pattern and the TCCH symbol pattern in the middle symbol period S(k+1), whether the delay amount of the timing of receiving the TCCH signal 200 is less than the one-symbol period, or equal to or more than the one-symbol period and less than the two-symbol period, or equal to or more than the two-symbol period, can be identified. In a case where the delay amount of the timing of receiving the TCCH signal 200 is equal to or more than the one-symbol period and less than the two-symbol period, a value obtained by adding the value "128" to the peak value in the last symbol period S(k+2) is set as the delay amount. In a case where the delay amount of the timing of receiving the TCCH signal 200 is equal to or more than the two-symbol period, a value obtained by adding "256" to the peak value in the last symbol period S(k+2) is set as the delay amount. Thereby, in the timing of receiving the signal from the communication terminal, a delay of the two-symbol period or longer can be detected.

<Modulation of Detection Section>

Figure 9:
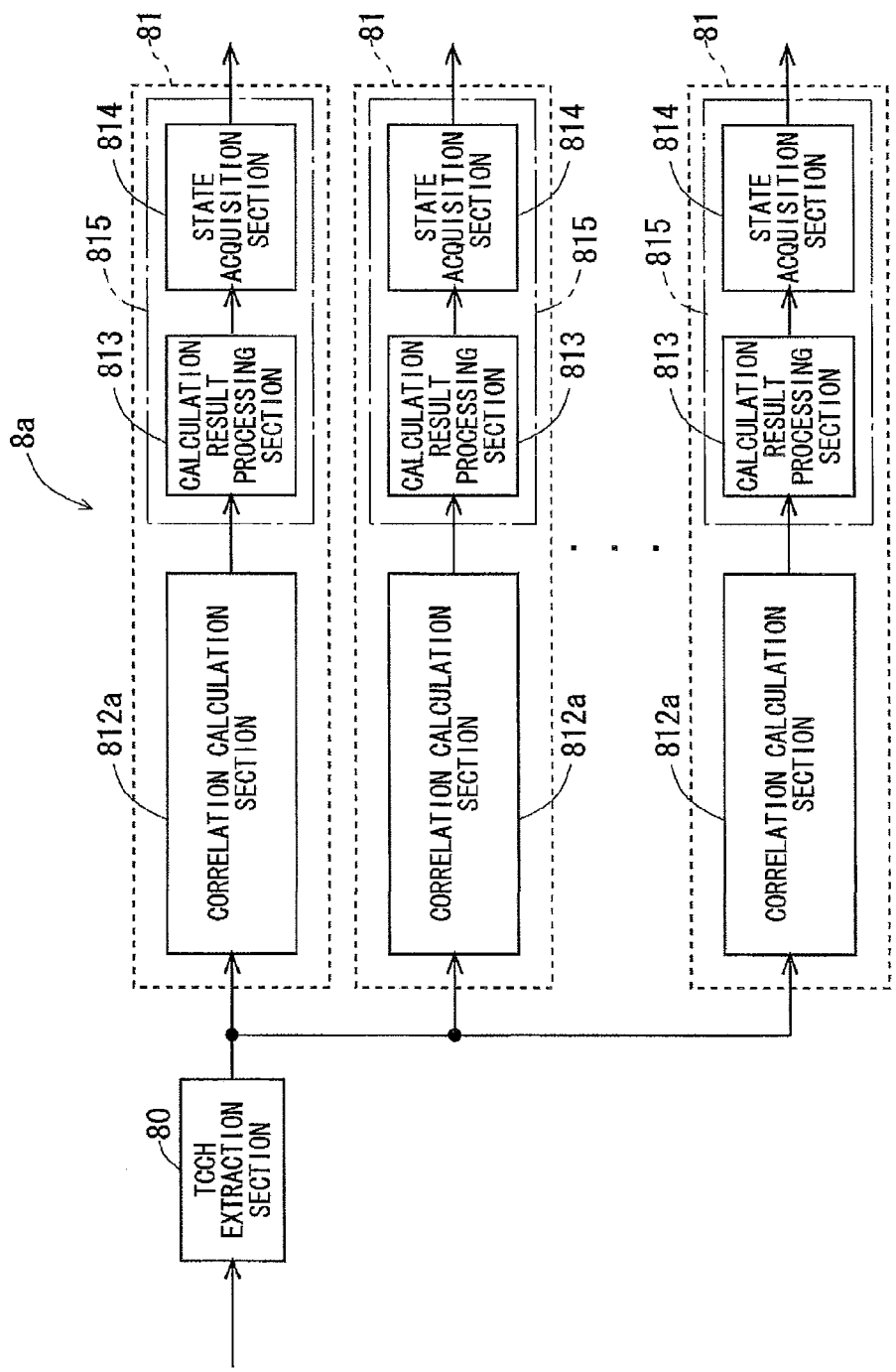
FIG. 9 is a diagram showing a configuration of a detection section according to a modification of the embodiment of the present invention.

In the example described above, the IFFT processing section 811 performs the IFFT process on the correlation value of correlation between the TCCH symbol pattern and the demodulated complex symbol pattern which is calculated by the correlation value calculation section 810, and thereby the correlation value of correlation between the delay TCCH symbol pattern and the demodulated complex symbol pattern is obtained. However, the correlation value may be obtained without performing the IFFT process. FIG. 9 is a diagram showing a configuration of a detection section 8a in such a case. The detection section 8a shown in FIG. 9 is identical to the detection section 8 shown in FIG. 4, except that correlation calculation sections 812a are provided instead of the correlation calculation sections 812.

Each of the correlation calculation sections 812a obtains, in the manner of the expression (1) mentioned above, a correlation value (hereinafter referred to as "delay correlation value") of correlation between the demodulated complex symbol pattern and the delay TCCH symbol pattern which is obtained by rotating the phase of the TCCH symbol pattern, which corresponds to the TCCH processing section 81 that includes this correlation calculation section 812a, by an amount corresponding to (T×r/128), in the last symbol period S(k+2) of one sub-slot SSn. The correlation value is gained with respect to each of values that r can take. Here, the value r represents an integer in a range of 0 to 127. Thereby, a graph similar to the correlation value graph of FIG. 6 described above can be obtained.

In the same manner, the correlation calculation section 812a obtains, in the manner of the expression (1) mentioned above, a correlation value (delay correlation value) of correlation between the demodulated complex symbol pattern and the delay TCCH symbol pattern, which is obtained by rotating the phase of the TCCH symbol pattern, which corresponds to the TCCH processing section 81 that includes this correlation calculation section 812a, by an amount corresponding to (T×r/128), in the symbol period S(k+3) that follows the one sub-slot SSn. The correlation value is gained with respect to each of values that r can take.

The correlation calculation section 812a obtains these delay correlation values with respect to each of the first sub-slot SS1 to the fourth sub-slot SS4. As a result, in each of the correlation calculation sections 812a, eight sets of 128 delay correlation values are obtained in accordance with the TCCH symbol pattern corresponding thereto.

In the reception state acquisition section 815 according to this modification, the above-described sample value is replaced with the delay correlation value, and then the same process is performed. As a result, similarly to the above-described example, the detection section 8a can detect a delay amount of the one-symbol period or longer in the timing of receiving the signal from the communication terminal.

In the foregoing embodiment and modification thereof, the case where the invention of the present application is applied to the next-generation PHS has been described. Needless to say, the invention of the present application is applicable to communication systems other than the next-generation PHS, such as LTE (Long Term Evolution) and WiMAX (Worldwide Interoperability for Microwave Access).

While the invention has been described in detail, the foregoing description is in all aspects illustrative and not restrictive. It is understood that numerous other modifications and variations not illustrated herein can be devised without departing from the scope of the invention.

DESCRIPTION OF THE REFERENCE NUMERALS 1 communication device
9 data processing section
20 reception section
21 transmission section
812, 812a correlation calculation section
815 reception state acquisition section

The invention claimed is:

1. A communication device communicating with a communication partner device, said communication device comprising:

a reception section for receiving a known signal that is continuously and repeatedly transmitted from said communication partner device during a plurality of continuous partner's unit time periods specified based on a timing in said communication partner device;

a correlation calculation section for calculating correlation between a signal received by said reception section and said known signal in each of at least two unit time periods in a plurality of own unit time periods specified based on a timing in said communication device and corresponding to said plurality of partner's unit time periods and subsequent one own unit time period that follows said plurality of own unit time periods, said at least two unit time periods including either one of a leading unit time period and a last unit time period and also including one of said plurality of own unit time periods other than said leading unit time period; and a delay amount acquisition section for obtaining, based on a result of the calculation in said correlation calculation section, a delay amount of a timing of receiving the signal from said communication partner device.

2. The communication device according to claim 1, wherein said at least two unit time periods is configured with a leading unit time period and a plurality of unit time periods that continuously follow said leading unit time period, in said plurality of own unit time periods corresponding to said plurality of partner's unit time periods and said subsequent one own unit time period that follows said plurality of own unit time periods.

3. The communication device according to claim 2, further comprising
a transmission section for transmitting, to said communication partner device, a signal for notification of said delay amount obtained by said delay amount acquisition section.

4. The communication device according to claim 3, further comprising
a reception level acquisition section for obtaining, based on a result of the calculation in said correlation calculation section, a reception level of the signal supplied from said communication partner device.

5. The communication device according to claim 4, further comprising:
a determination section for determining a transmission level of said communication partner device based on said reception level obtained by said reception level acquisition section; and
a transmission section for transmitting, to said communication partner device, a signal for notification of said transmission level determined by said determination section.

6. A delay amount detection method for detecting, in a communication device, a delay amount of a timing of receiving a signal from a communication partner device, said delay amount detection method comprising:
a reception step of receiving a known signal that is continuously and repeatedly transmitted from said communication partner device during a plurality of continuous partner's unit time periods specified based on a timing in said communication partner device;
a calculation step of calculating correlation between a signal received by said reception section and said known signal in each of at least two unit time periods in a plurality of own unit time periods specified based on a timing in said communication device and corresponding to said plurality of partner's unit time periods and subsequent one own unit time period that follows said plurality of own unit time periods, said at least two unit time periods including either one of a leading unit time period and a last unit time period and also including one of said plurality of own unit time periods other than said leading unit time period; and
an acquisition step of obtaining, based on a result of the calculation in said calculation step, a delay amount of a timing of receiving the signal from said communication partner device.

* * * * *